United States Patent Office 3,660,553
Patented May 2, 1972

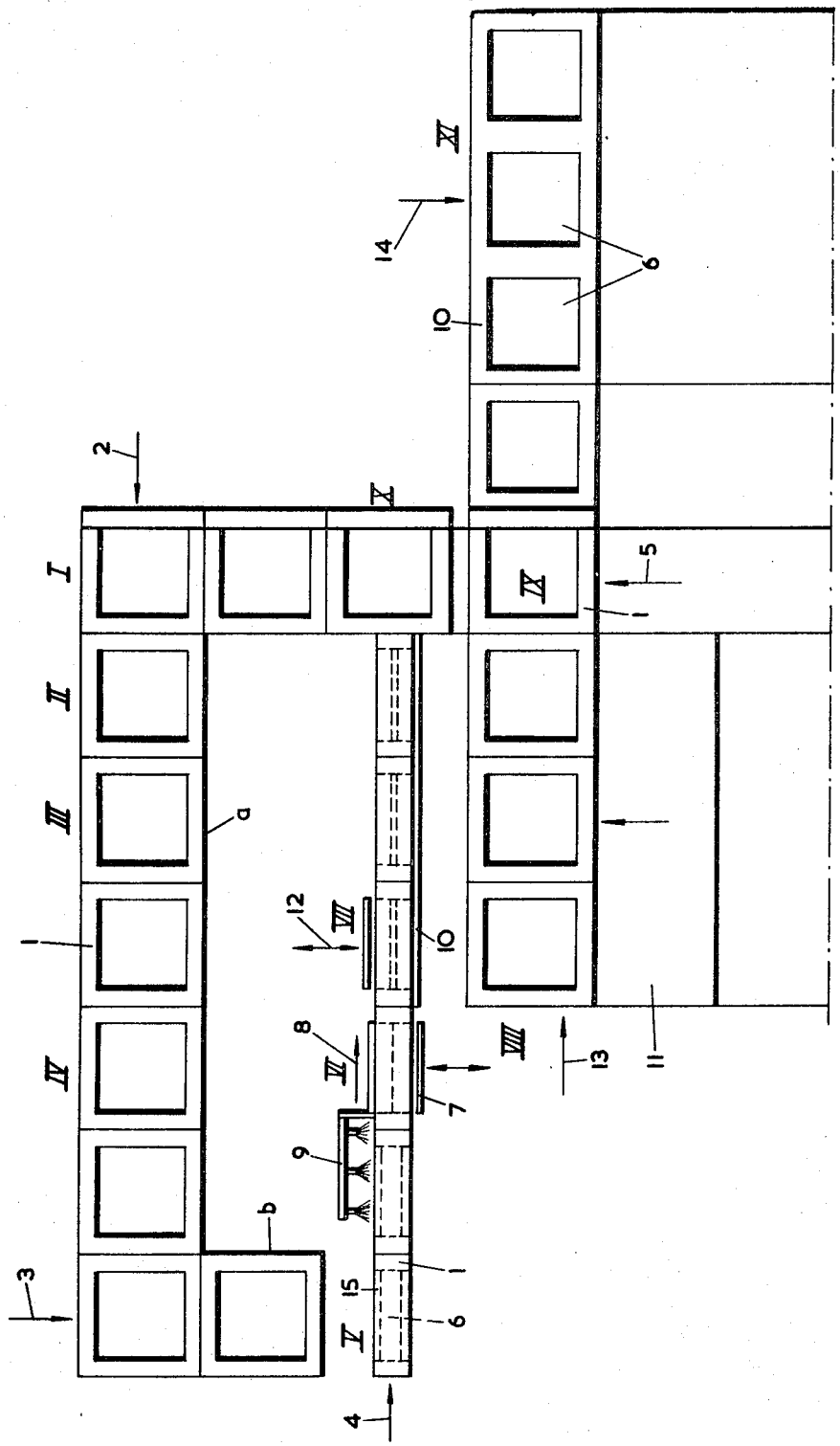

3,660,553
METHOD FOR MANUFACTURING ARTICLES FROM A HARDENING SUBSTANCE
Dirk Kalkman, Krimpen aan den Ijssel, Netherlands, assignor to N.V. Machinefabriek Gebr. Kalkman, Krimpen aan den Ijssel, Netherlands
Filed Aug. 21, 1969, Ser. No. 851,917
Claims priority, application Netherlands, Aug. 22, 1968, 6811992
Int. Cl. B28b *11/08*
U.S. Cl. 264—71
5 Claims

ABSTRACT OF THE DISCLOSURE

A method of manufacturing concrete tiles on a production line basis. Molds with removable bottom plates are filled and packed with concrete. The molds are then tilted to a vertical position where the bottom plate is removed while an additional plate is placed on the other side. The mold is then returned to a horizontal position on top of the newly added plate and the mold frame is removed leaving the desired tile shape to set.

BACKGROUND OF THE INVENTION

Field of the invention

This invention relates to a method for manufacturing tiles from a hardening substance such as concrete.

Description of the prior art

It is known in the prior art to manufacture tiles by placing a hardening substance, such as concrete, into a horizontally supported mold with a detachable bottom plate. The hardening substance is generally packed and the moldings are then taken out of the mold and deposited on plates or platforms to set. A standard apparatus for producing tiles is a rotary table which contains mold cavities having the desired shape with a bottom plate or face plate supported at the bottom of the mold. The mold cavities are filled with a relatively dry mortar such as concrete and then stamped or pressed with an appropriate conventional device. Subsequently, the moldings are removed from the mold and placed on plates or platforms in order to permit the moldings to set. In producing large tiles, there exists numerous problems concerned with the lifting of the tile from the mold. It is necessary to manufacture large tiles with a thickness sufficient to permit lifting from the mold without producing any impermissible deformations. It has also been found that using molds with several mold cavities presents a problem in providing a uniform grip by clamps on all the moldings during the lifting procedure. The conventional use of rotary tables is inefficient due to the time loss during the rotation of the table to place the mold into an operative position. A rotary table generally has four mold cavities located at 90 degree positions. Larger rotary tables having for example, 8 mold cavities located at 45 degree positions have been tried but the doubling of the number of mold cavities does not result in a doubling of the output due to the increased diameter of the tables and the fact that larger rotary tables are expensive and plagued with technical problems.

A particular problem has been the manufacturing of concrete tile and the so-called washed gravel tiles. These tiles are manufactured with a top layer having a gravel aggregate that permits a portion of the layer to be washed away to leave the desired surface configuration. Wash gravel tiles cannot be manufactured by the conventional method because any gravel aggregate having a particle size above 5 millimeters is generally broken up by the stamping apparatus used in packing the molds. Vibration has been tried for packing the molds but it has been found that a considerably thicker mortar must be used, which sticks to the bottom plate or face plate producing difficulties in lifting the moldings off the plate.

In an attempt to avoid these problems, the prior art has tried to cover the upper layer of the mortar with paper to retard the hardening of this layer. The washing process is then carried out when the tile has acquired a certain amount of set. This method has proved to require a considerable expenditure of manpower and produces a relatively low output. Further, the use of paper increases the cost of the finished product.

SUMMARY OF THE INVENTION

The present invention provides a method that permits tile output to be increased by a relatively simple manufacturing process. This process permits the manufacturing of both ordinary tiles and washed tiles of various thicknesses. The method further provides a method of producing very thin tiles and offers the manufacturer a wide choice in the composition of the mortar from which the tiles are to be manufactured.

These results are accomplished by positioning the packed molds in a vertical plane and placing a front plate on the side of the molding opposite the bottom plate. The molding is pushed against the front plate with the help, if necessary, of the bottom plate. The molding is displaced through the mold until the bottom plate is beyond the mold frame where it is then removed. The mold is tilted back into the horizontal plane with the front plate now having the mold resting upon it. Thus, the mold frame has been inverted 180° from its original position. At this point, the molds are removed and the moldings are allowed to set.

This process removes the problem of lifting moldings out of the mold frame with the aid of clamps. It further provides a wide choice of moldings and composition of the mortar. This system is particularly adaptable to the use of molds with several cavities.

The bottom plate can now be used to push back the moldings and may then be removed from the mold by a magnet. A modified form of the process has the molding in the vertical position shifted through the mold to such extent that the bottom plate just extends beyond the mold and is thereby capable of being slid off. This method of withdrawing the bottom plate has been found to lessen the damage to the moldings both when dry and thick mortar is used.

In the manufacturing of tiles of various thicknesses, the same molding frame can be used since it is possible to control the tiles during the entire procedure, particularly when placing them on the plates or platforms from which the tiles are set aside.

The method of this invention has been found to be highly adaptable to manufacturing tiles with a washed top surface. After the bottom plate has been slid off the molding frame, this surface may be washed with sprayers before the molding is then pushed back into the mold. This washing with sprayers, for example, washing away the concrete between the gravel aggregate, is carried out when the tiles are in vertical position, thereby insuring a proper discharge of the material loosened by the water. After the washing procedure, the bottom plate can be used for pushing back the moldings against the front plate. Any danger of the bottom plate getting stuck has been entirely eliminated after the washing and in fact the plate may even have a corrective influence on the flatness of the washed top layer during the pushing back step of the molding into the mold frame.

It is possible with the method of this invention to first evenly distribute a coating layer in the mold where the coating consists of a thick vibrating layer. A core layer consisting of concrete which is capable of being stamped is then poured into the mold. This combination produces tiles which have a uniformly finished top face, or a properly washable top face when the coating has been provided with an aggregate, while maintaining a core layer which provides the required solidity and uniform size of the tiles. The core layer of the stampable concrete exhibits these characteristics of solidity and uniform size because of the slight shrinkage and greater compressive strength as compared to tiles manufactured from thicker mortar that can only be packed by vibration. The tiles manufactured by this method of the invention are not only remarkable for distinct thickness and uniform size over tiles manufactured by other known methods, but also for their precise top faces.

The structure used in this invention for manufacturing concrete tiles is capable of using the conventional molds with detachable bottom plates. The molds are moved along the conveyor line or similar apparatus, past various processing stations for filling the molds, packing the molds, and removing the moldings. The molds themselves consist of molding frames open at both the top and bottom, the mold cavity corresponding to the size of the bottom plate. The molding frames are generally moved in stepped fashion past the various processing stations. The processing line is provided with a station for up-ending or tilting the mold following the filling and packing stations. In addition, the apparatus is provided with a station for providing a horizontally movable die or face plate for being fitted into the mold on the side opposite the bottom plate. The next station is provided with means for moving the bottom plate parallel to the face of the molding blocks. The following station is provided with means for placing a plate against the open back face of the molding box and utilizing a horizontally movable mechanism on the bottom plate side with the front plate fitting in the mold for pushing the moldings against the front plate.

Because the molding boxes molding frames are moved stepwise in close order, the loss in time experienced with the rotary tables is eliminated. The fact that the molding cavity corresponds in area to the sides of the bottom plate allows the bottom plate to be forced in an outward direction once the molds have been raised.

The apparatus which slides the bottom plate off of the molding frame may be designed in such a way that it is adapted to push the molding back into the mold. The bottom plate, after having been slid off the molding frame, can be used, for example, for forcing the molding into the mold and against the plate.

In accordance with one embodiment of the present invention, there may be provided a movable spraying means at the site of the sliding means, the sprayers being directed towards the molding frame so that the top face of the tiles may be washed with the sprayers. This additional feature helps make the apparatus suitable for manufacturing a great variety of tiles, both with respect to the composition, type of upper face, dimension and shape.

In the preferred embodiment of the invention, the molding frames may be moved in a rectangular path. The rectangular path is so designed so that at the end of the operating cycle, the empty molding frames have arrived at the initial filling means and may be used again. This closed operating loop is obviously much shorter than when the molding frames are only moved in a straight line. The rectangular path is preferably in a horizontal plane to enable the stepwise movement of the molding frames to be effected with a simple feed mechanism.

It is preferred that the filling and packing stations be located at one side of the rectangular track while the remaining stations be located on the other side. The feed mechanism is preferably located on the outside of the rectangular track, and provided with means for raising, lowering and moving the plates parallel with the side of the rectangle. A device must be provided for returning the spent molding frames and lifting up the molding frames to the initial starting point. An important advantage of this arrangement is that the molding frames need not be turned around, thereby facilitating the automation of the system. The finished tiles are transported on the plates to the storage yard where they are left to harden. Storage yards are known per se and it is a conventional procedure to let the tiles set for 24 hours whereupon the plates are emptied and returned to the processing apparatus.

An additional advantage of the rectangular path is that it makes it possible for the molding frame to be filled more evenly. It is known that automatic filling machines have a tendency to fill the molding cavities more compacting adjacent one end portion of the mold than adjacent the opposite portion and this effects the compactness of the tile. According to the invention, the filling means can comprise two feeders operating one after the other and from opposite directions to provide the total fill of the mold. In operation both feeders are activated simultaneously with one moving across an empty molding cavity while the other moves across a partially filled mold cavity. Additional features will become apparent from the following description and the accompanying drawings wherein:

BRIEF DESCRIPTION OF THE DRAWINGS

The diagrammatic drawing illustrates the principal apparatus and steps of the invention.

BRIEF DESCRIPTION OF THE PREFERRED EMBODIMENT

The drawing discloses a number of molding boxes 1 which have been placed on a movable horizontal support. These molding boxes are moved along a rectangular path in the direction of arrows 2, 3, 4 and 5 by means of a feed mechanism, not shown, such as pneumatic or hydraulic cylinders. The molding box comprises rectangular frames having a length $a$ and a width $b$. The molding boxes 1 will generally be moved in a stepwise function and will correspond to either the length or width $a$ and $b$ as to the unit of travel.

At station I, the coating filling material is inserted into the molding cavity. The filler used for this purpose is known per se and is the conventional material used in the rotary table method. At the second station II, the coating material is evenly distributed and packed by means of a vibrator (not shown). At the site of the station III, the material for filling the core layer is inserted into the mold cavity.

At station III, the core layer is filled. This can be done optionally by first filling half of the cavity mold and then, at the next step location, filling the remaining half of the cavity mold, as indicated by the blank unit step between III and IV in the drawing. After the filling of the cavity mold, the molding box is advanced to station IV where the tile mold is packed by a stamper when, for example, the principal component of the tile is packable concrete. If the tile to be manufactured is to have a washed top layer, the stamper must not break the gravel aggregate of this top layer. This can be accomplished by using a thick mortar in the coating, or by lowering the force of the impact of the stamper or by using a vibrator instead of a stamper.

After the molding box leaves station IV, it reaches the end of the rectangular side and starts a transverse movement along the direction of arrow 3 until it reaches the site of station V where the molding box may be placed on its side by means not shown in the drawing. When the molding box reaches site station V, it contains a bottom plate 15 and the packed molding material 6 both standing in the vertical plane. The molding box is now moved two places further until they reach station VI where, with the aid of a die 7 which fits closely inside the molding cavity, the molding 6 is pushed until the plate 15 will protrude beyond the mold frame. This bottom plate 15 is then slid off in the direction of its own face, for example, in the direction of arrow 8 in the drawings. At this point, the molding material is standing by itself.

Coupled to the sliding mechanism for removing the bottom plate is a vertically movable sprayer 9 that is adapted to wash the surface of the molding in the vicinity of station 6.

At station VII, a front plate or platform 10 is placed against the mold or molds, this plate having been transported via a return path 11 and raised by means not shown in the drawing. The molding is then pushed back until it comes to rest against plate 10 by means of an apparatus that moves in the horizontal plane, for example a plunger adapted to move according to arrow 12 in the drawings. This apparatus may be coupled to the mechanism for sliding off the bottom plate and may even use the bottom plate for pushing the molding back against plate 10.

The drawing illustrates three molds having a common front plate or platform 10, although any desired number of molds can be used. Leaving station VII, the molds are rotated back into the horizontal plane and are now inverted 180° from their initial position. The molds now rest on plate 10 and may be moved stepwise by conveying means in the direction of arrow 13. Upon reaching station IX, the molding box 1 may be removed together with the bottom plate by, for example, a magnet. The bottom plate and the molding box free from the mold are then positioned at station X and moved along the direction of arrow 5 to the initial station I. The means of locomotion are not shown in the drawing. The plates 10 carry the molding 6 from station IX stepwise in the direction of arrow 13 until they arrive at station XI at which point they are transferred to a storage yard in the direction of arrow 14. The storage yard is not shown in the drawings.

What is claimed is:

1. A method for manufacturing articles such as concrete tiles from a hardening material where the articles are manufactured in moulds resting horizontally on a support and having detachable bottom plates, said moulds passing subsequent stations at which:
    (1) in one station each mould is filled with the hardening material;
    (2) in the next station the material is packed in the moulds;
    (3) and in the following station the moulding is removed from the mould and placed on plates to harden;
   the improvement comprising the following steps:
    (a) rotating each mould 90° after the hardening material has been packed to place the mould in a vertical plane resting on its side;
    (b) pushing a die into the open side of the mould when in its vertical position to shift the moulding through the mould into a position in which the bottom plate is just protruding from the mould;
    (c) withdrawing the die;
    (d) removing the bottom plate by sliding it off the moulding in a direction parallel to the bottom plane of the mould;
    (e) spraying the surface of the moulding which was contacting the bottom plate;
    (f) placing a front supporting plate against the open side of the mould through which the die passed;
    (g) pushing the moulding against the supporting plate;
    (h) further rotating the mould and supporting plate 90° until the mould rests on the supporting plate in a horizontal position; and
    (i) removing the mould to leave the moulding on the supporting plate.

2. A method according to claim 1, in which the bottom plate, after the spraying of the surface of the moulding, is then used for pressing the moulding against the supporting plate to thereby insure a flat sprayed facing to the moulded article.

3. A method according to claim 1, in which the die is used as the supporting plate.

4. A method according to claim 1, in which the moulds are moved stepwise in a rectangular path in abutting relationship, the stations for filling and packing being located at one side of said rectangular path, and the stations for placing the moulds in a vertical position, treating the mouldings in the vertical moulds, and further rotating the moulds back to the horizontal position, are located at the opposite side of the rectangular path.

5. A method according to claim 1, in which, prior to rotating the moulds into a vertical position, the filling of the mould is performed by first putting a thick mortar with a washable aggregate upon the bottom plate, packing it by vibration, filling the remaining part of the mould with a concrete capable of being stamped, and packing the contents of the mould.

References Cited
UNITED STATES PATENTS

| | | | |
|---|---|---|---|
| 751,089 | 2/1904 | Malette. | |
| 788,379 | 4/1905 | Rich | 264—162 X |
| 930,665 | 8/1909 | Henry | 25—41 L |
| 1,229,582 | 6/1917 | Butterworth | 264—162 X |
| 1,493,744 | 5/1924 | Ferguson | 25—41 H X |
| 1,588,841 | 6/1926 | Knapp | 264—162 X |
| 2,890,492 | 6/1959 | Smith | 264—71 |
| 3,006,053 | 10/1961 | Miller | 25—41 L |
| 3,333,035 | 7/1967 | Williams | 264—162 X |
| 3,426,112 | 2/1969 | Taylor-Smith | 264—71 |
| 3,497,580 | 2/1970 | Taylor-Smith | 264—72 |
| 2,135,554 | 11/1938 | Babor | 25—41 L |

DONALD J. ARNOLD, Primary Examiner

A. M. SOKAL, Assistant Examiner

U.S. Cl. X.R.

25—1 C, 2; 264—162, 256, 294